(12) United States Patent  (10) Patent No.: US 8,975,329 B2
Koevoets et al.  (45) Date of Patent: Mar. 10, 2015

(54) POLY(PHENYLENE ETHER) ARTICLES AND COMPOSITIONS

(71) Applicant: SABIC Innovative Plastics IP B.V., Bergen op Zoom (NL)

(72) Inventors: Christiaan Johannes Henricus Koevoets, Noord Braband (NL); Marcellus Antonius Adrianus Verhagen, Bergen op Zoom (NL); Erik Stam, Hoogerheide (NL)

(73) Assignee: SABIC Global Technologies B.V. (NL)

( * ) Notice: Subject to any disclaimer, the term of this patent is extended or adjusted under 35 U.S.C. 154(b) by 75 days.

(21) Appl. No.: 13/684,654

(22) Filed: Nov. 26, 2012

(65) Prior Publication Data
US 2013/0142976 A1 Jun. 6, 2013

Related U.S. Application Data

(60) Provisional application No. 61/566,081, filed on Dec. 2, 2011.

(51) Int. Cl.
*C08L 71/12* (2006.01)
(52) U.S. Cl.
USPC ............ 524/508; 428/36.9; 525/523; 525/89
(58) Field of Classification Search
CPC ............ C08K 3/04; C08K 3/22; C08K 3/30; C08K 5/52; C08K 7/14; C08L 25/04; C08L 43/04; C08L 71/12; C08L 77/00
USPC ..................... 524/508; 428/36.9; 525/89, 523
See application file for complete search history.

(56) References Cited

U.S. PATENT DOCUMENTS

| 3,306,874 | A | 2/1967 | Hay |
| 3,383,435 | A | 5/1968 | Cizek et al. |
| 3,708,455 | A | 1/1973 | Nakanishi et al. |
| 3,811,323 | A | 5/1974 | Swenson |
| 3,835,200 | A | 9/1974 | Lee, Jr. |
| 3,906,983 | A | 9/1975 | Parkison |
| 3,960,808 | A | 6/1976 | Katchman |
| 4,128,602 | A | 12/1978 | Katchman et al. |
| 4,128,603 | A | 12/1978 | Katchman et al. |
| 4,128,604 | A | 12/1978 | Katchman et al. |
| 4,242,254 | A | 12/1980 | Abolins |
| 4,423,189 | A | 12/1983 | Haaf |
| 4,543,391 | A | 9/1985 | Kuribayashi et al. |
| 4,804,712 | A | 2/1989 | Traugott et al. |
| 4,874,810 | A | 10/1989 | Lee, Jr. et al. |
| 4,892,904 | A | 1/1990 | Ting |
| 4,900,786 | A | 2/1990 | Abolins et al. |
| 5,040,950 | A | 8/1991 | Dalquist, III et al. |
| 5,214,109 | A | 5/1993 | Gallucci et al. |
| 5,523,360 | A | 6/1996 | Jelenic et al. |
| 5,960,543 | A | 10/1999 | Moon |
| 6,057,401 | A | 5/2000 | Modic |
| 6,129,121 | A | 10/2000 | Kohle |
| 6,241,840 | B1 | 6/2001 | Pratt et al. |
| 6,274,375 | B1 | 8/2001 | McMinn, Jr. |
| 6,762,218 | B2 | 7/2004 | Geprags et al. |
| 7,616,873 | B1 | 11/2009 | Seitz |
| 7,845,688 | B2 | 12/2010 | Gallagher et al. |
| 7,891,572 | B1 | 2/2011 | Murray |
| 8,063,133 | B2 | 11/2011 | Todt et al. |
| 2002/0128387 | A1 | 9/2002 | Adedeji et al. |
| 2002/0156185 | A1 | 10/2002 | Adedeji et al. |
| 2002/0165317 | A1 | 11/2002 | Adedeji et al. |
| 2003/0075827 | A1 | 4/2003 | Demia et al. |
| 2003/0078331 | A1 | 4/2003 | Kim et al. |
| 2004/0026962 | A1 | 2/2004 | Wieschermann et al. |
| 2004/0059042 | A1 | 3/2004 | Hartle et al. |
| 2004/0068053 | A1 | 4/2004 | Adedeji et al. |
| 2005/0154130 | A1 | 7/2005 | Adedeji et al. |
| 2007/0117912 | A1 | 5/2007 | Balfour et al. |
| 2008/0029172 | A1 | 2/2008 | Willems |
| 2008/0185323 | A1 | 8/2008 | Kargenian |
| 2008/0197077 | A1 | 8/2008 | Swartley et al. |
| 2008/0312371 | A1 | 12/2008 | Todt et al. |
| 2009/0084453 | A1 | 4/2009 | Quinn et al. |
| 2009/0304501 | A1 | 12/2009 | Dickertmann et al. |

FOREIGN PATENT DOCUMENTS

| EP | 0432641 | A2 | 6/1991 |
| JP | 11-310674 | * | 11/1999 |
| JP | 1999310674 | A | 11/1999 |
| JP | 2001-64503 | * | 3/2001 |
| JP | 2001064503 | A | 3/2001 |
| WO | 8705311 | | 9/1987 |

(Continued)

OTHER PUBLICATIONS

Jacqueline I. Kroschwitz, Concise Encyclopedia of Polymer Science and Engineering, John Wiley & Sons, 1990, pp. 870-871.
International Application No. PCT/US2008/064617; International Search Report; Date of Mailing Aug. 18, 2008, 6 pages.
International Application No. PCT/US2008/064617; Written Opinion; Date of Mailing Aug. 18, 2008, 8 pages.
EP0529378; Mar. 3, 1993; Abstract Only (1 page).
CA1167583; May 15, 1984; Abstract Only (1 page).
WO2009104107; Aug. 27, 2009; Abstract Only (1 page).
Choi et al., Analysis of trace residual 1,3-butadiene in poly(acrylonitrile-co-butadiene-co-styrene), Jouran of Industrial and Engineering Chemistry, 17, 2011, pp. 394-396.
The Commission of the European Communities, Office Journal of the European Communities, Aug. 15, 2002, 41 pages.

(Continued)

*Primary Examiner* — Robert D. Harlan
(74) *Attorney, Agent, or Firm* — Cantor Colburn LLP

(57) ABSTRACT

A composition useful for the injection molding of fluid engineering parts includes specific amounts of a high molecular weight poly(phenylene ether), a polystyrene, and glass fibers. The composition provides improved hydrostability and reduces or eliminates the butadiene monomer that is present in comparative compositions containing rubber-modified polystyrene. Fluid engineering articles prepared from the composition are described.

15 Claims, No Drawings

(56) References Cited

FOREIGN PATENT DOCUMENTS

| WO | 9014386 | 11/1990 |
| WO | 9304119 | 3/1993 |
| WO | 9914273 | 3/1999 |
| WO | 0228971 A1 | 4/2002 |
| WO | 2004026962 A2 | 4/2004 |
| WO | 2006019410 A2 | 2/2006 |
| WO | 2008046862 A1 | 4/2008 |
| WO | 2008046866 A1 | 4/2008 |
| WO | 2008156964 A1 | 12/2008 |

OTHER PUBLICATIONS

Food Contact Compliance, Plastics Europe—Association of Plastic Manufacturers, downloaded from http://www.plasticseurope.org/what-is-plastic/types-of-plastics/styrenics-polymers/food-contact-compliance.aspx, on May 29, 2013, 2 pages.

International Search Report for International Application No. PCT/IB2012/056772, International Application Filing Date Nov. 27, 2012, Date of Mailing Jun. 27, 2013, 5 pages.

Written Opinion for International Application No. PCT/IB201/056772, International Application Filing Date Nov. 27, 2012, Date of Mailing Jun. 27, 2013, 8 pages.

* cited by examiner

POLY(PHENYLENE ETHER) ARTICLES AND COMPOSITIONS

CROSS REFERENCE TO RELATED APPLICATIONS

This application claims priority to U.S. Provisional Application Ser. No. 61/566081 filed on Dec. 2, 2011, which is incorporated herein by reference in its entirety.

BACKGROUND OF THE INVENTION

Poly(phenylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and coated wire.

In order to eliminate the lead content typically present in the brass used to fabricate fluid engineering articles, poly(phenylene ether) compositions have been used as replacements for brass. See, for example, U.S. Patent Application Publication No. US 2008/0312371 A1 of Todt et al. There is also a desire to eliminate the monomer butadiene from materials that contact food and water. Many of the poly(phenylene ether) compositions utilized for fluid engineering articles contain rubber-modified polystyrene to improve impact strength. Rubber-modified polystyrene contains polybutadiene, and the poly(phenylene ether) compositions containing rubber-modified polystyrene have small but significant concentrations of free butadiene that can be above the limits of some existing and proposed regulations governing materials contacting food and water.

There is a desire for fluid engineering materials that substantially reduce or eliminate both lead and butadiene. There is also a desire for low-lead and low-butadiene fluid engineering materials that exhibit improved hydrostability relative to known poly(phenylene ether) compositions used for fluid engineering. Moreover, it would be desirable to improve hydrostability without significantly compromising the impact strength associated with poly(phenylene ether) compositions that incorporate polybutadiene-containing impact modifiers.

BRIEF SUMMARY OF EMBODIMENTS OF THE INVENTION

One embodiment is a fluid engineering article comprising a composition comprising: about 25 to about 50 weight percent of a poly(phenylene ether); about 25 to about 55 weight percent of a polystyrene; and about 5 to about 35 weight percent of glass fibers; wherein the poly(phenylene ether) has a weight average molecular weight of at least 70,000 atomic mass units after being compounded with the polystyrene and the glass fibers; wherein the composition comprises less than or equal to 1 milligram butadiene per kilogram of composition; and wherein all weight percents are based on the total weight of the composition, unless a different weight basis is specified.

Another embodiment is a composition comprising: about 25 to about 50 weight percent of a poly(phenylene ether); about 25 to about 55 weight percent of a polystyrene; and about 5 to about 35 weight percent of glass fibers; wherein the poly(phenylene ether) has a weight average molecular weight of at least 70,000 atomic mass units after being compounded with the polystyrene and the glass fibers; wherein the composition comprises less than or equal to 1 milligram butadiene per kilogram of composition; and wherein all weight percents are based on the total weight of the composition, unless a different weight basis is specified.

These and other embodiments are described in detail below.

DETAILED DESCRIPTION OF THE INVENTION

The present inventors have determined that a particular butadiene-free poly(phenylene ether) composition exhibits improved hydrostability without substantially compromising the impact strength typically associated with the use of polybutadiene-containing impact modifiers. Thus, one embodiment is a fluid engineering article comprising a composition comprising: about 25 to about 50 weight percent of a poly(phenylene ether); about 25 to about 55 weight percent of a polystyrene; and about 5 to about 35 weight percent of glass fibers; wherein the poly(phenylene ether) has a weight average molecular weight of at least 70,000 atomic mass units after being compounded with the polystyrene and the glass fibers; wherein the composition comprises less than or equal to 1 milligram butadiene per kilogram of composition; and wherein all weight percents are based on the total weight of the composition, unless a different weight basis is specified.

Another embodiment is a composition comprising: about 25 to about 50 weight percent of a poly(phenylene ether); about 25 to about 55 weight percent of a polystyrene; and about 5 to about 35 weight percent of glass fibers; wherein the poly(phenylene ether) has a weight average molecular weight of at least 70,000 atomic mass units after being compounded with the polystyrene and the glass fibers; wherein the composition comprises less than or equal to 1 milligram butadiene per kilogram of composition; and wherein all weight percents are based on the total weight of the composition, unless a different weight basis is specified.

The composition comprises a poly(phenylene ether). Suitable poly(phenylene ether)s include those comprising repeating structural units having the formula

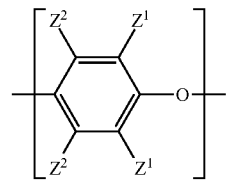

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) has a weight average molecular weight of at least 70,000 atomic mass units after being compounded with the polystyrene and the glass fibers. In some embodiments, the poly(phenylene ether) after being compounded with the polystyrene and the glass fibers has a weight average molecular weight of 70,000 to about 110,000 atomic mass units, specifically 70,000 to about 100,000 atomic mass units, more specifically 70,000 to about 90,000 atomic mass units. When the poly(phenylene ether) after being compounded with the polystyrene and the glass fibers has a weight average molecular weight less than 70,000 atomic mass units, articles molded from the composition can exhibit inadequate hydrostatic stability. Weight average molecular weight can be determined by gel permeation chromatography as described in detail in the working examples.

In some embodiments, the poly(phenylene ether) before being compounded with the polystyrene and the glass fibers has a weight average molecular weight of about 60,000 to about 90,000 atomic mass units, specifically about 60,000 to about 80,000 atomic mass units, more specifically about 60,000 to about 70,000 atomic mass units. Such a pre-compounding molecular weight can provide the desired post-compounding molecular weight described above.

In some embodiments, the poly(phenylene ether) is essentially free of incorporated diphenoquinone residues. In the context, "essentially free" means that the less than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly (phenylene ether) comprising terminal or internal diphenoquinone residues. For example, when a poly(phenylene ether) is prepared by oxidative polymerization of 2,6-dimethylphenol to yield poly(2,6-dimethyl-1,4-phenylene ether) and 3,3', 5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of about 0.5 to about 1 deciliter per gram, specifically about 0.5 to about 0.7 deciliter per gram, more specifically about 0.55 to about 0.65 deciliter per gram, measured at 25° C. in chloroform.

In some embodiments, the poly(phenylene ether) comprises molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations comprising at least one of the foregoing.

In some embodiments, the composition comprises the poly (phenylene ether) in an amount of about 25 to about 50 weight percent, specifically about 30 to about 45 weight percent, more specifically about 35 to about 40 weight percent, based on the total weight of the composition.

In addition to the poly(phenylene ether), the composition comprises a polystyrene. As used herein, the term "polystyrene" refers to a polymer comprising at least 90 weight percent of repeating units derived from polymerization of styrene. In some embodiments, the polystyrene comprises at least 95 weight percent, specifically at least 98 weight percent, of repeating units derived from polymerization of styrene. In some embodiments, the polystyrene is a styrene homopolymer. The styrene homopolymer can be atactic, isotactic, or syndiotactic.

In some embodiments, the polystyrene has a number average molecular weight of about 10,000 to about 200,000 atomic mass units, specifically about 30,000 to about 100,000 atomic mass units. In a particular embodiment, the polystyrene is an atactic homopolystyrene having a number average molecular weight of about 30,000 to about 100,000 atomic mass units.

In some embodiments, the polystyrene comprises an atactic polystyrene. The atactic polystyrene is a homopolystyrene. In some embodiments, the atactic polystyrene has a melt flow index of about 0.5 to about 10 grams per 10 minutes, specifically about 1 to about 5 grams per 10 minutes, measured at 200° C. and 5 kilogram load according to ASTM D1238-10.

In some embodiments, the composition comprises the polystyrene in an amount of about 25 to about 55 weight percent, specifically about 30 to about 50 weight percent, more specifically about 30 to about 45 weight percent, even more specifically about 30 to about 40 weight percent, yet more specifically about 30 to about 35 weight percent, based on the total weight of the composition.

In addition to the poly(phenylene ether) and the polystyrene, the composition comprises glass fibers. Suitable glass fibers include those based on E, A, C, ECR, R, S, D, and NE glasses, as well as quartz. In some embodiments, the glass fiber has a diameter of about 2 to about 30 micrometers, specifically about 5 to about 25 micrometers, more specifically about 10 to about 15 micrometers. In some embodiments, the length of the glass fibers before compounding is about 2 to about 7 millimeters, specifically about 3 to about 5 millimeters. The glass fiber can, optionally, include a so-called adhesion promoter to improve its compatibility with the poly(phenylene ether) and the polystyrene. Adhesion promoters include chromium complexes, silanes, titanates, zirco-aluminates, propylene maleic anhydride copolymers, reactive cellulose esters and the like. Suitable glass fiber is commercially available from suppliers including, for example, Owens Corning, Nippon Electric Glass, PPG, and Johns Manville.

In some embodiments, the composition comprises the glass fibers in an amount of about 5 to about 35 weight percent, specifically about 10 to about 35 weight percent, more specifically about 15 to about 35 weight percent, still more specifically about 20 to about 35 weight percent, yet more specifically about 25 to about 35 weight percent, based on the total weight of the composition.

In some embodiments the composition further comprises a small amount of a polyethylene as a mold release agent. In some embodiments, the polyethylene has a melt flow rate of about 15 to about 30 grams per centimeter$^3$, specifically about 18 to about 26 grams per centimeter$^3$, measured according to ISO 1133 at 190° C. and 2.16 kilogram load. When present, the polyethylene can be used in an amount of about 0.5 to 2 weight percent, specifically about 1 to 2 weight percent, based on the total weight of the composition.

The composition can, optionally, further include one or more additives. Additives include, for example, stabilizers, mold release agents, lubricants, processing aids, drip retardants, nucleating agents, UV blockers, dyes, pigments, antioxidants, anti-static agents, blowing agents, mineral oil, metal deactivators, and antiblocking agents. When additives are present, the total amount of additives is typically less than or equal to about 10 weight percent, specifically less than or equal to about 6 weight percent, more specifically less than or equal to about 4 weight percent, still more specifically less than or equal to about 2 weight percent, based on the total weight of the composition.

The composition comprises less than or equal to 1 milligram butadiene per kilogram of composition. In the context, "butadiene" refers to butadiene monomer; it does not include polymerized butadiene residue. In some embodiments, the composition comprises less than or equal to 0 1 milligram butadiene per kilogram of composition, specifically less than or equal to 0.05 milligram butadiene per kilogram of composition, more specifically less than or equal to 0.01 milligram butadiene per kilogram of composition, even more specifically less than or equal to 0.001 milligram butadiene per kilogram of composition. Such low levels of butadiene can be achieved by reducing or eliminating the use of homopolymers and copolymers of butadiene, including hydrogenated homopolymers and copolymers of butadiene.

One of the advantages of the composition is its simplicity. For example, in some embodiments, the composition comprises less than or equal to 2 weight percent of any polymer other than the poly(phenylene ether) and the polystyrene. In some embodiments, the composition excludes any polymer other than the poly(phenylene ether), the polystyrene, and the optional polyethylene.

In a very specific embodiment, the composition comprises about 30 to about 40 weight percent, specifically about 32 to about 38 weight percent, of the poly(phenylene ether); the poly(phenylene ether) comprises a poly(2,6-dimethyl-1,4-phenylene ether); the composition comprises about 47 to about 57 weight percent, specifically about 49 to about 55 weight percent, of the polystyrene; the polystyrene comprises an atactic polystyrene; the composition comprises about 5 to about 15 weight percent, specifically about 7 to about 13 weight percent, of the glass fibers; and the composition comprises less than or equal to 0.05 milligram butadiene per kilogram of composition. In some embodiments, the composition further comprises about 0.5 to 2 weight percent of a polyethylene having a melt flow rate of about 15 to about 30 grams per centimeter$^3$ measured according to ISO 1133 at 190° C. and 2.16 kilogram load. In some embodiments, the composition consists of the poly(phenylene ether), the polystyrene, the glass fibers, and, optionally, up to 10 weight percent, specifically up to 6 weight percent, more specifically up to 4 weight percent, even more specifically up to 2 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

In another very specific embodiment, the composition comprises about 25 to about 35 weight percent, specifically about 27 to about 33 weight percent, of the poly(phenylene ether); the poly(phenylene ether) comprises a poly(2,6-dimethyl-1,4-phenylene ether); the composition comprises about 42 to about 52 weight percent, specifically about 44 to about 50 weight percent, of the polystyrene; the polystyrene comprises an atactic polystyrene; the composition comprises about 15 to about 25 weight percent, specifically about 17 to about 23 weight percent, of the glass fibers; and the composition comprises less than or equal to 0.05 milligram butadiene per kilogram of composition. In some embodiments, the composition further comprises about 0.5 to 2 weight percent of a polyethylene having a melt flow rate of about 15 to about 30 grams per centimeter$^3$ measured according to ISO 1133 at 190° C. and 2.16 kilogram load. In some embodiments, the composition consists of the poly(phenylene ether), the polystyrene, the glass fibers, and, optionally, up to 10 weight percent, specifically up to 6 weight percent, more specifically up to 4 weight percent, even more specifically up to 2 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

In another very specific embodiment, the composition comprises about 32 to about 42 weight percent, specifically about 34 to about 40 weight percent, of the poly(phenylene ether); the poly(phenylene ether) comprises a poly(2,6-dimethyl-1,4-phenylene ether); the composition comprises about 25 to about 35 weight percent, specifically about 27 to about 33 weight percent, of the polystyrene; wherein the polystyrene comprises an atactic polystyrene; wherein the composition comprises about 25 to about 35 weight percent, specifically about 27 to about 33 weight percent, of the glass fibers; and the composition comprises less than or equal to 0.05 milligram butadiene per kilogram of composition. In some embodiments, the composition further comprises about 0.5 to 2 weight percent of a polyethylene having a melt flow rate of about 15 to about 30 grams per centimeter$^3$ measured according to ISO 1133 at 190° C. and 2.16 kilogram load. In some embodiments, the composition consists of the poly(phenylene ether), the polystyrene, the glass fibers, and, optionally, up to 10 weight percent, specifically up to 6 weight percent, more specifically up to 4 weight percent, even more specifically up to 2 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

The composition can be prepared by melt blending the components. The melt blending can be performed using common equipment such as ribbon blenders, Henschel mixers, Banbury mixers, drum tumblers, single-screw extruders, twin-screw extruders, multi-screw extruders, co-kneaders, and the like. For example, the present composition can be prepared by melt-blending the components in a twin-screw extruder at a temperature of about 280 to about 360° C., specifically about 300 to about 330° C.

The composition is useful for the fabrication of fluid engineering articles. Such articles include, for example, pipes, pipe liners, pipe junctions, hot and cold water device components, boiler components (including flue connectors, hydraulic blocks, and heat exchanger housings), central heating device components, combined hot water and central heating device components, heat exchanger components, heat pump housings, water pump housings (including swimming pool pump housings), filter housings, water meter housings, water valves (including faucet under-body valves, and faucet post valves), impellers, and faucet spouts. The details of thermoplastic fluid engineering articles are known in the art. For example, U.S. Pat. No. 6,129,121 to Kohle describes a pipe junction or "nipple" in which the body can be formed from thermoplastic; U.S. Pat. No. 6,241,840 B1 to Pratt et al. describes a thermoplastic liner pipe for potable water; U.S. Pat. No. 3,906,983 to Parkison et al. describes a thermoplastic bathtub spout; U.S. Pat. No. 7,845,688 B2 to Gallagher et al. describes a piping component with a thermoplastic body; U.S. Pat. No. 7,891,572 to Murray describes a boiler temperature monitoring and low water monitoring system with a thermoplastic insulator; U.S. Pat. No. 7,616,873 B1 to Seitz describes a thermoplastic heat exchanger; U.S. Pat. No. 6,274,375 to McMinn describes a vent hood cleaning system with thermoplastic spray nozzles; U.S. Pat. No. 5,040,950 to Dalquist III et al. describes a power washing apparatus with a thermoplastic bearing housing member; U.S. Patent Application Publication No. US 2009/0304501 A1 of Dickertmann describes a pond pump with a thermoplastic pump housing; U.S. Patent Application Publication No. US 2008/0185323 A1 of Kargenian describes a water treatment system with thermoplastic upper and lower manifolds; U.S. Patent Application Publication No. US 2008/0197077 A1 of Swartley et al. describes a low pressure drinking water purifier with a thermoplastic supply pressure regulator; U.S. Pat. No. 3,811,323 to Swenson describes a liquid meter with a thermoplastic inlet hub assembly; U.S. Patent Application Publication No. US 2008/0029172 A1 of Willems describes an integrated pressure-proof fluid container with various thermoplastic components; U.S. Patent Application No. US 2009/0084453 A1 of Quinn et al. describes a fluid treatment system control valve with a thermoplastic housing; U.S. Pat. No. 5,960,543 to Moon describes a thermoplastic pump impeller. The composition is particularly suited for the fabrication of articles that contact hot water. Fluid engineering articles can be formed by injection molding the composition. Illustrative injection molding conditions are described in the working examples below.

All of the compositional variations described above in the context of the composition apply as well to articles fabricated from the composition.

The invention includes at least the following embodiments.

Embodiment 1: A fluid engineering article comprising a composition comprising: about 25 to about 50 weight percent of a poly(phenylene ether); about 25 to about 55 weight percent of a polystyrene; and about 5 to about 35 weight percent of glass fibers; wherein the poly(phenylene ether) has a weight average molecular weight of at least 70,000 atomic mass units after being compounded with the polystyrene and the glass fibers; wherein the composition comprises less than or equal to 1 milligram butadiene per kilogram of composition; and wherein all weight percents are based on the total weight of the composition, unless a different weight basis is specified.

Embodiment 2: The fluid engineering article of embodiment 1, selected from the group consisting of pipes, pipe liners, pipe junctions, hot and cold water device components, boiler components, central heating device components, combined hot water and central heating device components, heat exchanger components, heat pump housings, water pump housings, filter housings, water meter housings, water valves, impellers, and faucet spouts.

Embodiment 3: The fluid engineering article of embodiment 1 or 2, wherein the poly(phenylene ether) has a weight average molecular weight of 70,000 to about 110,000 atomic mass units after being compounded with the polystyrene and the glass fibers.

Embodiment 4: The fluid engineering article of any of embodiments 1-3, wherein the poly(phenylene ether) has a weight average molecular weight of about 60,000 to about 90,000 atomic mass units before being compounded with the polystyrene and the glass fibers.

Embodiment 5: The fluid engineering article of any of embodiments 1-4, wherein the composition comprises less than or equal to 2 weight percent of any polymer other than the poly(phenylene ether) and the polystyrene.

Embodiment 6: The fluid engineering article of any of embodiments 1-5, wherein the composition further comprises about 0.5 to 2 weight percent of a polyethylene having a melt flow rate of about 15 to about 30 grams per centimeter$^3$ measured according to ISO 1133 at 190° C. and 2.16 kilogram load.

Embodiment 7: The fluid engineering article of embodiment 6, wherein the composition excludes any polymer other than the poly(phenylene ether), the polystyrene, and the polyethylene.

Embodiment 8: The fluid engineering article of embodiment 1, wherein the composition comprises about 30 to about 40 weight percent of the poly(phenylene ether); wherein the poly(phenylene ether) comprises a poly(2,6-dimethyl-1,4-phenylene ether); wherein the composition comprises about 47 to about 57 weight percent of the polystyrene; wherein the polystyrene comprises an atactic polystyrene; wherein the composition comprises about 5 to about 15 weight percent of the glass fibers; and wherein the composition comprises less than or equal to 0.05 milligram butadiene per kilogram of composition.

Embodiment 9: The fluid engineering article of embodiment 8, wherein the composition further comprises about 0.5 to 2 weight percent of a polyethylene having a melt flow rate of about 15 to about 30 grams per centimeter$^3$ measured according to ISO 1133 at 190° C. and 2.16 kilogram load.

Embodiment 10: The fluid engineering article of embodiment 8, wherein the composition consists of the poly(phenylene ether), the polystyrene, the glass fibers, and, optionally, up to 10 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

Embodiment 11: The fluid engineering article of embodiment 1, wherein the composition comprises about 25 to about 35 weight percent of the poly(phenylene ether); wherein the poly(phenylene ether) comprises a poly(2,6-dimethyl-1,4-phenylene ether); wherein the composition comprises about 42 to about 52 weight percent of the polystyrene; wherein the polystyrene comprises an atactic polystyrene; wherein the composition comprises about 15 to about 25 weight percent of the glass fibers; and wherein the composition comprises less than or equal to 0.05 milligram butadiene per kilogram of composition.

Embodiment 12: The fluid engineering article of embodiment 11, wherein the composition further comprises about 0.5 to 2 weight percent of a polyethylene having a melt flow rate of about 15 to about 30 grams per centimeter$^3$ measured according to ISO 1133 at 190° C. and 2.16 kilogram load.

Embodiment 13: The fluid engineering article of embodiment 11, wherein the composition consists of the poly(phenylene ether), the polystyrene, the glass fibers, and, optionally, up to 10 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

Embodiment 14: The fluid engineering article of embodiment 1, wherein the composition comprises about 32 to about 42 weight percent of the poly(phenylene ether); wherein the poly(phenylene ether) comprises a poly(2,6-dimethyl-1,4-phenylene ether); wherein the composition comprises about 25 to about 35 weight percent of the polystyrene; wherein the polystyrene comprises an atactic polystyrene; wherein the composition comprises about 25 to about 35 weight percent of the glass fibers; and wherein the composition comprises less than or equal to 0.05 milligram butadiene per kilogram of composition.

Embodiment 15: The fluid engineering article of embodiment 14, wherein the composition further comprises about 0.5 to 2 weight percent of a polyethylene having a melt flow rate of about 15 to about 30 grams per centimeter$^3$ measured according to ISO 1133 at 190° C. and 2.16 kilogram load.

Embodiment 16: The fluid engineering article of embodiment 14, wherein the composition consists of the poly(phenylene ether), the polystyrene, the glass fibers, and, optionally, up to 10 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

Embodiment 17: A composition comprising: about 25 to about 50 weight percent of a poly(phenylene ether); about 25 to about 55 weight percent of a polystyrene; and about 5 to about 35 weight percent of glass fibers; wherein the poly(phenylene ether) has a weight average molecular weight of at least 70,000 atomic mass units after being compounded with the polystyrene and the glass fibers; wherein the composition comprises less than or equal to 1 milligram butadiene per kilogram of composition; and wherein all weight percent are based on the total weight of the composition, unless a different weight basis is specified.

Embodiment 18: The composition of embodiment 17, wherein the poly(phenylene ether) has a weight average molecular weight of 70,000 to about 110,000 atomic mass units after being compounded with the polystyrene and the glass fibers.

Embodiment 19: The composition of embodiment 17 or 18, wherein the poly(phenylene ether) has a weight average molecular weight of about 60,000 to about 90,000 atomic mass units before being compounded with the polystyrene and the glass fibers.

Embodiment 20: The composition of any of embodiments 17-19, comprising less than or equal to 2 weight percent of any polymer other than the poly(phenylene ether) and the polystyrene.

Embodiment 21: The composition of any of embodiments 17-20, further comprising about 0.5 to 2 weight percent of a polyethylene having a melt flow rate of about 15 to about 30 grams per centimeter$^3$ measured according to ISO 1133 at 190° C. and 2.16 kilogram load.

Embodiment 22: The composition of embodiment 21, excluding any polymer other than the poly(phenylene ether), the polystyrene, and the polyethylene.

Embodiment 23: The composition of embodiment 17, wherein the composition comprises about 30 to about 40 weight percent of the poly(phenylene ether); wherein the poly(phenylene ether) comprises a poly(2,6-dimethyl-1,4-phenylene ether); wherein the composition comprises about 47 to about 57 weight percent of the polystyrene; wherein the polystyrene comprises an atactic polystyrene; wherein the composition comprises about 5 to about 15 weight percent of the glass fibers; and wherein the composition comprises less than or equal to 0.05 milligram butadiene per kilogram of composition.

Embodiment 24: The composition of embodiment 23, further comprising about 0.5 to 2 weight percent of a polyethylene having a melt flow rate of about 15 to about 30 grams per centimeter$^3$ measured according to ISO 1133 at 190° C. and 2.16 kilogram load.

Embodiment 25: The composition of embodiment 23, consisting of the poly(phenylene ether), the polystyrene, the glass fibers, and, optionally, up to 10 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

Embodiment 26: The composition of embodiment 17, wherein the composition comprises about 25 to about 35 weight percent of the poly(phenylene ether); wherein the poly(phenylene ether) comprises a poly(2,6-dimethyl-1,4-phenylene ether); wherein the composition comprises about 42 to about 52 weight percent of the polystyrene; wherein the polystyrene comprises an atactic polystyrene; wherein the composition comprises about 15 to about 25 weight percent of the glass fibers; and wherein the composition comprises less than or equal to 0.05 milligram butadiene per kilogram of composition.

Embodiment 27: The composition of embodiment 26, further comprising about 0.5 to 2 weight percent of a polyethylene having a melt flow rate of about 15 to about 30 grams per centimeter$^3$ measured according to ISO 1133 at 190° C. and 2.16 kilogram load.

Embodiment 28: The composition of embodiment 26, consisting of the poly(phenylene ether), the polystyrene, the glass fibers, and, optionally, up to 10 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

Embodiment 29: The composition of embodiment 17, wherein the composition comprises about 32 to about 42 weight percent of the poly(phenylene ether); wherein the poly(phenylene ether) comprises a poly(2,6-dimethyl-1,4-phenylene ether); wherein the composition comprises about 25 to about 35 weight percent of the polystyrene; wherein the polystyrene comprises an atactic polystyrene; wherein the composition comprises about 25 to about 35 weight percent of the glass fibers; and wherein the composition comprises less than or equal to 0.05 milligram butadiene per kilogram of composition.

Embodiment 30: The composition of embodiment 29, further comprising about 0.5 to 2 weight percent of a polyethylene having a melt flow rate of about 15 to about 30 grams per centimeter$^3$ measured according to ISO 1133 at 190° C. and 2.16 kilogram load.

Embodiment 31: The composition of embodiment 29, consisting of the poly(phenylene ether), the polystyrene, the glass fibers, and, optionally, up to 10 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof.

The invention is further illustrated by the following non-limiting examples.

EXAMPLE 1, COMPARATIVE EXAMPLES 1-5

Components used to form the inventive and comparative compositions are summarized in Table 1.

TABLE 1

| Component | Description |
|---|---|
| PPE 0.31 IV | Poly(2,6-dimethyl-1,4-phenlyene ether), CAS Reg. No. 25134-01-4, having an intrinsic viscosity of about 0.31 deciliter per gram measured at 25° C. in chloroform, and a pre-compounded weight average molecular weight of about 36,000 atomic mass units; obtained as PPO 808 from SABIC Innovative Plastics. |
| PPE 0.45 IV | Poly(2,6-dimethyl-1,4-phenlyene ether), CAS Reg. No. 25134-01-4, having an intrinsic viscosity of about 0.45 deciliter per gram measured at 25° C. in chloroform, and a pre-compounded weight average molecular weight of about 55,000 atomic mass units; obtained as PPO 800 from SABIC Innovative Plastics. |
| PPE 0.57 IV | Poly(2,6-dimethyl-1,4-phenlyene ether), CAS Reg. No. 25134-01-4, having an intrinsic viscosity of about 0.57 deciliter per gram measured at 25° C. in chloroform, and a pre-compounded weight average molecular weight of about 78,000 atomic mass units; obtained as PPO 805 from SABIC Innovative Plastics. |
| PS | Atactic polystyrene, CAS Reg. No. 9003-53-6, having a melt flow index of 2.4 centimeter$^3$ per 10 minutes measured at 200° C. and 5 kilogram load according to ISO 1133; obtained as EMPERA 251N from Ineos Nova. |
| SEP/PPE | A powder blend of 90 weight percent polystyrene-poly(ethylene-propylene) diblock copolymer and 10 weight percent poly(2,6-dimethyl-1,4-phenylene ether); the polystyrene-poly(ethylene-propylene) diblock copolymer had a styrene content of 35 weight percent and was obtained as KRATON G1701E from Kraton Polymers; the poly(2,6-dimethyl-1,4-phenylene ether) had an intrinsic viscosity of 0.40 deciliter per gram and was obtained as PPO 803 from SABIC Innovative Plastics. |
| Glass fiber | Chopped glass fiber having a thickness of about 14 micrometers and a silane surface treatment for compatibility with poly(phenylene ether); obtained as FT142A from Owens Corning. |
| Polyethylene | Polyethylene (ethylene homopolymer), CAS Reg. No. 9002-88-4, in powder form, having a melt flow rate of 22 grams/10 minutes measured according to ASTM D1238 at 190° C. and 2.16 kilogram load; obtained as SABIC LDPE 1922T from SABIC. |
| Antioxidant | Octadecyl 3,5-di-tert-butyl-4-hydroxyhydrocinnamate, CAS Reg. No. 2082-79-3; obtained as IRGANOX 1076 from Everspring. |
| Stabilizer | Tetrakis(2,4-di-tert-butylphenyl)[1,1-biphenyl]-4,4'-diylbisphosphonite; CAS Reg. No. 119345-01-6; obtained as IRGAFOS P-EPQ from Ciba. |
| Carbon black | Carbon black pigment; obtained as MPC Channel Black from Keystone Europe Limited. |

Compositions were compounded on a Werner & Pfleiderer ZSK-120 120 millimeter inner diameter twin-screw extruder. The extruder barrel temperatures from feed throat to die were 260, 260, 280, 290, 290, 270, 270, 250, 250, 330, 330, 330, 330, and 340° C. Prior to compounding, all components were dry blended and added to the feed throat of the extruder, except for the glass fibers that were fed downstream via a side feeder. Extrudate was cooled in a water bath, pelletized, and dried at 100° C. for two hours prior to injection molding.

Physical testing was conducted on parts injection molded on an Engel 75T injection molding machine using barrel zone temperatures of 60, 270, 290, 300, and 290° C. and a mold temperature of 100° C.

Tensile stress at break, expressed in units of megapascals (MPa), and tensile strain at break, expressed in units of percent, were measured at 23° C. according to ISO 527-2-1993 using a test speed of 5 millimeters per minute. Tensile modulus, expressed in units of megapascals (MPa), was measured at 23° C. according to ISO 527-2-1993 using a test speed of 1 millimeter per minute. Knitline tensile stress at break, expressed in units of megapascals (MPa), and knitline tensile strain at break, expressed in units of percent, were measured at 23° C. according to ISO 527-2-1993 using a test speed of 5 millimeters per minute. Knitline tensile modulus, expressed in units of megapascals (MPa), was measured at 23° C. according to ISO 527-2-1993 using a test speed of 1 millimeter per minute. Flexural stress at break, expressed in units of megapascals, and flexural modulus were measured at 23° C. according to ISO 178-2001 (Amendment 1, 2004). Unnotched Izod impact strength, expressed in units of kilojoules/meter$^2$, was measured according to ISO 180-2001 (Amendment 1, 2006) at 23° C. Vicat softening temperature, expressed in units of ° C., was measured according to ISO 306-2004 using a 50 Newton load and a heating rate of 120°

C. Density, expressed in grams per centimeter³, was measured according to ISO 1183-2004, Method A, at 23° C. Melt volume-flow rate, expressed in units of milliliters per 10 minutes, was measured according to ISO 1133-2005, Procedure B, at 300° C. and 10 kilogram load.

Material used for post-compounding molecular weight and free butadiene analyses was taken from pressure vessels injection molded on a Kraus Maffei 200 molding machine with temperature settings from hopper to barrel of 60, 270, 280, 290, 300, 295, 295, and 290° C., and a tool temperature of 120° C. The pressure vessels, which were also used to determine the resistance to internal pressure, had targeted dimensions of a length of 199 millimeters, a diameter of 47.3 millimeters, and a wall thickness of 3.0 millimeters. The actual dimensions of each pressure vessel were measured and used to calculate the actual hoop stress. Each pressure vessel had one semispherical closed end, and one open end that, during hydrostatic strength testing, was mounted to a stainless steel cylinder, sealed with an o-ring, and held in place with a nut that slides over the vessel to engage an edge rib at the open end of the sample. The pressure vessels were ISO 1167-2:2006 compliant. Samples were gated on the bottom of the pressure vessel thus creating a weld line. Long-term resistance to internal pressure was measured according to ISO 1167-1:2006 using a water-in-water test at 90° C. Samples were tested at different hoop stresses and times until failure was recorded. Time to failure was determined by creep rupture equipment and logged with data acquisition software. A trend line (linear regression) was calculated based on hoop stress (y-axis) and $\log_{10}$(time in hours) (x-axis), and this trend line was used to predict the time till failure for each composition using a failure criterion of 10 megapascals hoop stress.

Post-compounding poly(phenylene ether) number average molecular weight (MO and weight average molecular weight ($M_w$) were determined by gel permeation chromatography using polystyrene standards. The chromatograph was a Hewlett Packard HPLC 1100 equipped with a PL gel 5 micrometer by $10^3$ Angstrom column, a PL gel 5 micrometer by $10^5$ Angstrom column, and a 500 Angstrom STYRAGEL pre-column. Samples were prepared by dissolving 20 milligrams of solid sample (poly(phenylene ether) for pre-compounded samples, or complete composition for post-compounded samples) in 20 milliliters of chloroform with 2000 parts per million by weight toluene as a flow marker. Detection was at 280 nanometers. The system was calibrated with polystyrene standards having molecular weights of 900,000, 400,000, 170,000, 90,000, 65,000, 50,000, 25,000, 13,000, 5,780, 4,000, 2,500, and 1,300, all obtained from Pressure Chemical, Pittsburgh, Pa., USA. The sample injection volume was 75 microliters. The column temperature was 35° C. The run time was 16 minutes.

Free butadiene concentration was determined by gas chromatography using a headspace gas chromatograph equipped with CHROMPACK Capillary Column CP-PoraPLOT Q-HT of length 27.5 meters, internal diameter 0.32 millimeter, and film thickness 10 micrometers; an injection volume of 25 microliters. To prepare a stock solution of 1,3-butadiene, a septum for a 25 milliliter vial was perforated twice with a hollow needle, which was left in one of the perforations. The vial with septum and screwcap was weighed. Twenty milliliters of N,N-dimethylacetamide were pipetted into the vial. The vial was weighed again. The vial was closed with the screw cap, which included the hollow needle and second perforation. Working in a fume hood, approximately 0.3 grams of 1,3-butadiene was introduced to the vial via a thin tube through the second perforation. The vial with screw cap and hollow needle were reweighed. The concentration of 1,3-butadiene in the vial was calculated as milligrams of 1,3-butadiene per gram of solution. To prepare 1,3-butadiene standard solutions, four sample vials with septum and cap were weighed. Twenty milliliters of N,N-dimethylacetamide was pipetted into each vial. 1,3-Butadiene stock solution volumes of 0.1, 0.5, 1.0, and 2.0 milliliters were pipetted into the four vials, respectively. The vials were reweighed. The concentration of 1,3-butadiene in each vial was calculated in milligrams 1,3-butaiene per gram of solution. An internal standard solution was prepared by pipetting 20 milliliters of N,N-dimethylacetamide into a 25 milliliter vial, capping the vial, and adding 40 microliters of n-pentane via syringe. Analytical samples were prepared as follows. An empty 25 milliliter sample vial was purged with purified nitrogen. The headspace vial, including septum and cap, was weighed. Approximately 1.00 gram of solid sample was introduced to the vial, with the precise weight of the solid being noted. Five milliliters of N,N-dimethylacetamide was pipetted into the vial, which was then capped. Twenty microliters of internal standard solution was added to the vial via syringe through the septum. The procedure was repeated to generate a total of four sample vials. Twenty microliters of 1,3-butadiene standard solutions A, B, C, and D were introduced to the four vials, respectively. The vials were placed in a shaker and shaken overnight. A 1 microliter volume of the head space of each sample was analyzed by gas chromatography, and peak areas for the n-pentane internal standard and 1,3-butadiene were noted. For each sample, the concentration of 1,3-butadiene was calculated, as was the ratio of 1,3-butadiene and n-pentane peak areas. The ratio of peak area to added 1,3-butadiene concentration was plotted and fitted to the equation $y=ax+b$, where y is the peak area ratio of 1,3-butadiene to n-pentane, a is the slope of the regression in kilograms per milligram, x is the concentration of 1,3-butadiene in the solid in milligrams per kilogram, and b is the intercept of the regression line. The concentration of butadiene in the solid is calculated as b/a, where a is the slope of the regression line in kilograms per milligram, and b is the intercept of the regression line. The result is the concentration of 1,3-butadiene in the solid in units of milligrams 1,3-butadiene per kilogram of polymer (equivalent to parts per million by weight of 1,3-butadiene). The analysis had a limit of detection of 0.03 parts per million by weight.

Compositions and properties are summarized in Table 2, where component amounts are expressed in weight percent based on the total weight of the composition. The property results show, first, that all compositions did not contain a detectable amount of free butadiene (i.e., each sample contained less than or equal to 0.03 parts per million by weight of butadiene). Second, Comparative Example 1 with low intrinsic viscosity poly(phenylene ether) and no polystyrene-poly (ethylene-propylene) diblock copolymer exhibited significantly lower (poorer) unnotched Izod impact strength than the other compositions. Third, compositions with polystyrene-poly(ethylene-propylene) diblock copolymer exhibited significantly shorter (worse) times to failure in hydrostatic testing than did compositions without polystyrene-poly (ethylene-propylene) diblock copolymer. Fourth, although compositions with higher intrinsic viscosity poly(phenylene ether) exhibited lower melt flow than compositions with lower intrinsic viscosity poly(phenylene ether), the melt flow of the compositions with higher intrinsic viscosity poly(phenylene ether) was still sufficient for injection molding purposes. When all the property results are taken into consideration, the best property balance is exhibited by the Example 1 composition with high intrinsic viscosity poly(phenylene ether) and no polystyrene-poly(ethylene-propylene) diblock copolymer. That composition exhibited the best hydrostability, as well as good ductility and stiffness and heat resistance, and adequate melt flow.

TABLE 2

|  | C. Ex. 1 | C. Ex. 2 | C. Ex. 3 | C. Ex. 4 | Ex. 1 | C. Ex. 5 |
|---|---|---|---|---|---|---|
| COMPOSITIONS | | | | | | |
| PS | 30.2638 | 30.2638 | 30.2638 | 30.2638 | 30.2638 | 30.2638 |
| PPE 0.31 IV | 36.9844 | 34.1451 | 0.0000 | 0.0000 | 0.0000 | 0.0000 |
| PPE 0.45 IV | 0.0000 | 0.0000 | 36.9844 | 34.1451 | 0.0000 | 0.0000 |
| PPE 0.57 IV | 0.0000 | 0.0000 | 0.0000 | 0.0000 | 36.9844 | 34.1451 |
| SEP/PPE | 0.0000 | 2.8393 | 0.0000 | 2.8393 | 0.0000 | 2.8393 |
| Glass fiber | 30.0000 | 30.0000 | 30.0000 | 30.0000 | 30.0000 | 30.0000 |
| Polyethylene | 1.4679 | 1.4679 | 1.4679 | 1.4679 | 1.4679 | 1.4679 |
| Antioxidant | 0.1469 | 0.1469 | 0.1469 | 0.1469 | 0.1469 | 0.1469 |
| Stabilizer | 0.1469 | 0.1469 | 0.1469 | 0.1469 | 0.1469 | 0.1469 |
| Carbon black | 0.9901 | 0.9901 | 0.9901 | 0.9901 | 0.9901 | 0.9901 |
| PROPERTIES | | | | | | |
| Tensile stress at break (MPa) | 121 | 126 | 133 | 130 | 133 | 125 |
| Tensile strain at break (%) | 2.0 | 2.3 | 2.5 | 2.4 | 2.4 | 2.4 |
| Tensile modulus (MPa) | 9400 | 9315 | 9620 | 9465 | 9510 | 9295 |
| Knitline tensile stress at break (MPa) | 54 | 56 | 59 | 60 | 62 | 63 |
| Knitline tensile strain at break (%) | 0.8 | 0.9 | 1.0 | 1.0 | 1.0 | 1.1 |
| Knitline tensile modulus (MPa) | 7610 | 7215 | 7315 | 6990 | 7295 | 7075 |
| Flexural stress at break (MPa) | 156 | 165 | 193 | 174 | 179 | 167 |
| Flexural modulus (MPa) | 7351 | 7149 | 8118 | 7440 | 7452 | 6990 |
| Unnotched Izod (kJ/m$^2$) | 20 | 30 | 30 | 32 | 31 | 33 |
| Vicat temp. (° C.) | 157 | 153 | 158 | 154 | 157 | 154 |
| Density (g/cm$^3$) | 1.3 | 1.3 | 1.3 | 1.3 | 1.3 | 1.3 |
| Melt volume flow rate (cm$^3$/10 min) | 74 | 73 | 30 | 33 | 19 | 21 |
| Post-compounding PPE $M_w$ (AMU) | 43300 | 43600 | 63400 | 63900 | 77900 | 77700 |
| Post-compounding PPE $M_n$ (AMU) | 17600 | 17600 | 22000 | 21100 | 23900 | 23800 |
| Post-compounding PPE $M_w/M_n$ | 2.5 | 2.5 | 2.9 | 2.9 | 3.3 | 3.3 |
| Free butadiene (ppm) | ≤0.03 | ≤0.03 | ≤0.03 | ≤0.03 | ≤0.03 | ≤0.03 |
| Predicted Hydrostatic test time to failure (hours) at 10 MPa | 422 | 152 | 2056 | 1210 | 2853 | 2296 |

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A fluid engineering article comprising a composition consisting of:
    about 25 to about 50 weight percent of a poly(phenylene ether);
    about 25 to about 55 weight percent of a polystyrene comprising an atactic homopolystyrene having a number average molecular weight of 30,000 to 100,000 atomic mass units;
    about 5 to about 35 weight percent of glass fibers; and
    optionally, up to 10 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof;
    wherein the poly(phenylene ether) has a weight average molecular weight of at least 70,000 atomic mass units after being compounded with the polystyrene and the glass fibers;
    wherein the composition comprises less than or equal to 1 milligram butadiene per kilogram of composition; and
    wherein all weight percents are based on the total weight of the composition, unless a different weight basis is specified.

2. The fluid engineering article of claim 1, selected from the group consisting of pipes, pipe liners, pipe junctions, hot and cold water device components, boiler components, central heating device components, combined hot water and central heating device components, heat exchanger components, heat pump housings, water pump housings, filter housings, water meter housings, water valves, impellers, and faucet spouts.

3. The fluid engineering article of claim 1, wherein the poly(phenylene ether) has a weight average molecular weight of 70,000 to about 110,000 atomic mass units after being compounded with the polystyrene and the glass fibers.

4. The fluid engineering article of claim 1, wherein the poly(phenylene ether) has a weight average molecular weight of about 60,000 to about 90,000 atomic mass units before being compounded with the polystyrene and the glass fibers.

5. The fluid engineering article of claim 1, wherein the composition comprises less than or equal to 2 weight percent of any polymer other than the poly(phenylene ether) and the polystyrene.

6. The fluid engineering article of claim 1,
    wherein the composition comprises about 30 to about 40 weight percent of the poly(phenylene ether);

wherein the poly(phenylene ether) comprises a poly(2,6-dimethyl-1,4-phenylene ether);
wherein the composition comprises about 47 to about 57 weight percent of the polystyrene;
wherein the composition comprises about 5 to about 15 weight percent of the glass fibers; and
wherein the composition comprises less than or equal to 0.05 milligram butadiene per kilogram of composition.

7. The fluid engineering article of claim 1,
wherein the composition comprises about 25 to about 35 weight percent of the poly(phenylene ether);
wherein the poly(phenylene ether) comprises a poly(2,6-dimethyl-1,4-phenylene ether);
wherein the composition comprises about 42 to about 52 weight percent of the polystyrene;
wherein the composition comprises about 15 to about 25 weight percent of the glass fibers; and
wherein the composition comprises less than or equal to 0.05 milligram butadiene per kilogram of composition.

8. The fluid engineering article of claim 1,
wherein the composition comprises about 32 to about 42 weight percent of the poly(phenylene ether);
wherein the poly(phenylene ether) comprises a poly(2,6-dimethyl-1,4-phenylene ether);
wherein the composition comprises about 25 to about 35 weight percent of the polystyrene;
wherein the composition comprises about 25 to about 35 weight percent of the glass fibers; and
wherein the composition comprises less than or equal to 0.05 milligram butadiene per kilogram of composition.

9. A composition consisting of:
about 25 to about 50 weight percent of a poly(phenylene ether);
about 25 to about 55 weight percent of a polystyrene comprising an atactic homopolystyrene having a number average molecular weight of 30,000 to 100,000 atomic mass units;
about 5 to about 35 weight percent of glass fibers; and
optionally, up to 10 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof;
wherein the poly(phenylene ether) has a weight average molecular weight of at least 70,000 atomic mass units after being compounded with the polystyrene and the glass fibers;
wherein the composition comprises less than or equal to 1 milligram butadiene per kilogram of composition; and
wherein all weight percent are based on the total weight of the composition, unless a different weight basis is specified.

10. The composition of claim 9, wherein the poly(phenylene ether) has a weight average molecular weight of 70,000 to about 110,000 atomic mass units after being compounded with the polystyrene and the glass fibers.

11. The composition of claim 9, wherein the poly(phenylene ether) has a weight average molecular weight of about 60,000 to about 90,000 atomic mass units before being compounded with the polystyrene and the glass fibers.

12. The composition of claim 9, comprising less than or equal to 2 weight percent of any polymer other than the poly(phenylene ether) and the polystyrene.

13. The composition of claim 9,
wherein the composition comprises about 30 to about 40 weight percent of the poly(phenylene ether);
wherein the poly(phenylene ether) comprises a poly(2,6-dimethyl-1,4-phenylene ether);
wherein the composition comprises about 47 to about 57 weight percent of the polystyrene;
wherein the composition comprises about 5 to about 15 weight percent of the glass fibers; and
wherein the composition comprises less than or equal to 0.05 milligram butadiene per kilogram of composition.

14. The composition of claim 9,
wherein the composition comprises about 25 to about 35 weight percent of the poly(phenylene ether);
wherein the poly(phenylene ether) comprises a poly(2,6-dimethyl-1,4-phenylene ether);
wherein the composition comprises about 42 to about 52 weight percent of the polystyrene;
wherein the composition comprises about 15 to about 25 weight percent of the glass fibers; and
wherein the composition comprises less than or equal to 0.05 milligram butadiene per kilogram of composition.

15. The composition of claim 9,
wherein the composition comprises about 32 to about 42 weight percent of the poly(phenylene ether);
wherein the poly(phenylene ether) comprises a poly(2,6-dimethyl-1,4-phenylene ether);
wherein the composition comprises about 25 to about 35 weight percent of the polystyrene;
wherein the composition comprises about 25 to about 35 weight percent of the glass fibers; and
wherein the composition comprises less than or equal to 0.05 milligram butadiene per kilogram of composition.

* * * * *